United States Patent
Von Viebahn et al.

(10) Patent No.: US 7,330,780 B2
(45) Date of Patent: Feb. 12, 2008

(54) SAFETY SYSTEM FOR AIRCRAFT

(75) Inventors: Harro Von Viebahn, Modautal (DE); Jens Schiefele, Wiesbaden (DE)

(73) Assignee: Diehl Avionik Systeme GmbH, Frankfurt a.M. (DE)

( * ) Notice: Subject to any disclaimer, the term of this patent is extended or adjusted under 35 U.S.C. 154(b) by 497 days.

(21) Appl. No.: 10/511,649

(22) PCT Filed: Apr. 16, 2003

(86) PCT No.: PCT/DE03/01244

§ 371 (c)(1),
(2), (4) Date: Oct. 18, 2004

(87) PCT Pub. No.: WO03/088181

PCT Pub. Date: Oct. 23, 2003

(65) Prior Publication Data

US 2005/0173594 A1   Aug. 11, 2005

(30) Foreign Application Priority Data

Apr. 18, 2002   (DE) .................................. 102 17 222

(51) Int. Cl.
*G06F 17/00* (2006.01)
*G08G 5/00* (2006.01)
*B64D 45/00* (2006.01)

(52) U.S. Cl. .................... 701/3; 701/14; 701/11; 701/301; 701/302; 340/961; 340/963; 340/964

(58) Field of Classification Search ................ 701/3, 701/11, 14, 301–302; 340/961, 963, 964
See application file for complete search history.

(56) References Cited

U.S. PATENT DOCUMENTS

| | | | |
|---|---|---|---|
| 3,899,662 A * | 8/1975 | Kreeger et al. | 345/619 |
| 5,488,563 A | 1/1996 | Chazelle et al. | |
| 6,201,482 B1 * | 3/2001 | Schiefele et al. | 340/961 |
| 6,675,095 B1 * | 1/2004 | Bird et al. | 701/301 |
| 7,035,721 B2 * | 4/2006 | Koncelik, Jr. | 701/9 |
| 7,110,866 B1 * | 9/2006 | Dutu | 701/11 |
| 2003/0055540 A1 * | 3/2003 | Hansen | 701/3 |
| 2003/0182060 A1 * | 9/2003 | Young | 701/301 |

FOREIGN PATENT DOCUMENTS

| | | |
|---|---|---|
| DE | 196 09 613 A1 * | 9/1997 |
| DE | 101 46 167 A1 | 9/2001 |
| DE | 201 16 233 U1 | 10/2001 |
| EP | 0 886 847 B1 | 3/1997 |
| EP | 886847 A1 * | 12/1998 |
| WO | WO 96/05562 A1 | 2/1996 |
| WO | WO 9734276 A1 * | 9/1997 |
| WO | WO 03/038471 A1 | 5/2003 |

* cited by examiner

*Primary Examiner*—Cuong Nguyen
(74) *Attorney, Agent, or Firm*—Milde & Hoffberg, LLP

(57) ABSTRACT

This invention relates to a safety system for aircraft, wherein prohibited airspaces which aircraft may not enter are marked on a digitally stored image of the airspace, wherein the aircraft is provided with an automatic control device that automatically steers the aircraft on to an alternative route, which is situated outside the prohibited airspace, when the probability that the aircraft will enter the prohibited airspace exceeds a predetermined threshold value.

19 Claims, 4 Drawing Sheets

SAFETY SYSTEM FOR AIRCRAFT

BACKGROUND OF THE INVENTION

The present invention relates to a system (method and apparatus) for preventing improper use of aircraft, causing a crash on to a target due to violence, for example.

SUMMARY OF THE INVENTION

The present invention concerns a safety system for aircraft, wherein prohibited airspaces which aircraft may not enter are marked on a digitally stored image of the airspace, wherein the aircraft is provided with an automatic control device, and wherein on approaching a prohibited airspace the control device automatically steers the aircraft on to an alternative route which is situated outside the prohibited airspace. With the safety system according to the invention, an aircraft can be prevented from entering the airspace above regions which are particularly at risk—hereinafter also termed prohibited regions. For example, these prohibited regions can be cities, nuclear power stations, or individual buildings or industrial installations which are particularly critical or vulnerable to attack.

With the system according to the invention, provision can be made for the height of the prohibited airspace to be greater than the height which can be reached by the aircraft. However, it is also possible to set the height of the prohibited airspace lower, so that aircraft can fly over the prohibited airspace at a greater height, but if they approach the prohibited airspace from above or from the side they are steered on to an alternative route.

The safety system according to the invention can be activated permanently. In order to prevent unwanted automatic control if there is an unintentional, possibly only marginal or permissible, entry into the prohibited airspace, provision can be made according to a further embodiment of the system according to the invention for the automatic control only to be activated after the input of a command or after of the activation of an input device, and for it only to be possible to deactivate the automatic control in a secure manner.

The means for inputting the command should advantageously be designed so that the command can still be input by the crew in the event of a threat by hijackers. Deactivation can be protected by the input of a code word, for example. If this does not appear secure enough, and if forced deactivation can possibly be effected by attackers, provision is made in one form of this embodiment for it only to be possible to deactivate the automatic control by a device situated outside the aircraft, or for deactivation only to be possible when the aircraft is on the ground. The latter can be determined by the inwardly springing wheel suspension, for example.

In another embodiment of the safety system according to the invention, the automatic control includes an automatic landing. In this connection, the location of the automatic landing can preferably be predetermined by a device situated outside the aircraft. According to another embodiment, control on the alternative route can be taken over by a device situated outside the aircraft, so as to be able to control the further movements of the aircraft even before landing without having to rely on a sequence of automatic operations.

In a further advantageous embodiment of the safety system according to the invention, when the automatic control is activated a message is sent to a device for air traffic control. Air traffic control devices are thereby rendered capable of taking measures for safeguarding the airspace in which the aircraft which is being steered automatically on to an alternative route is situated, such as warning or diverting other aircraft, for example.

To prevent the aircraft from being endangered by other moveable objects (aircraft) when it is automatically steered on to the alternative route, provision can be made for automatic control also to be effected if an approach to moveable objects occurs.

According to another embodiment, the aircraft is also automatically steered on to an alternative route if it approaches other objects, particularly other aircraft. For this purpose, information on the positions and optionally on the directions of movement and speeds of movement of the aircraft is transmitted between the aircraft via suitable data channels or radio links.

A method of identifying a risk of collision during air travel is described in EP 0 886 847 B1 and in U.S. Pat. No. 6,201,482 B1, which is incorporated herein by reference. Advantageously, this method is suitable for the safety system according to the invention, for which, in detail, the following is provided:

the airspace is divided into predetermined volume elements, for the aircraft, probabilities are calculated with which the aircraft will be situated in predetermined volume elements at a plurality of selected points in time (residence probabilities), the probabilities of the residence of the particular aircraft in each volume element (collision probabilities) are calculated for the predetermined volume elements and for the selected points in time from the residence probabilities of the particular aircraft and from the residence probabilities, which are set to one, of the volume elements of the prohibited airspace, and an alternative route is calculated if the collision probability exceeds a predetermined value for at least one volume element.

In this embodiment of the safety system according to the invention, it is advantageously possible to calculate alternative routes. Moreover, alternative routes can be calculated in good time before the prohibited airspace is entered. In this embodiment, for the automatic selection of alternative routes which are as advantageous as possible, a plurality of alternative routes with a deviation which increases from alternative route to alternative route is calculated, as a test, according to recognised or established alternative rules, and the calculated alternative route which, at the smallest deviation, results in a probability of entry into the prohibited airspace which is less than a predetermined threshold value, is selected and is converted into a control command.

In order to arrive at an alternative route in a direction which is as favourable as possible, the following provision can be made: when a limiting deviation is reached without the probability of entry into the prohibited airspace being correspondingly reduced, alternative routes in another direction can be calculated. Finally, endangerments due to the use of the alternative route can be avoided in this embodiment by additionally taking into consideration residence probabilities of other objects for the calculation of the alternative route.

When the aircraft approaches the prohibited airspace, and in the presence of other objects, the question of a priority arises for the calculation of the alternative route. In order to solve this problem, this embodiment makes provision for the residence probabilities for volume elements which are situated in an edge region around the prohibited airspace to be set to a lesser value than that of the prohibited airspace. The probability values can range between 0.2 and 1, for example.

In one advantageous embodiment of the safety system according to the invention, a warning signal for the pilot is emitted if the aircraft approaches a prohibited airspace. This warning signal can be emitted optically and/or acoustically. Moreover, provision can be made for a warning signal for the pilot to be emitted if the safety system takes over the automatic control of the aircraft.

In another advantageous embodiment, provision is made for prohibited airspaces to be displayed a on a screen, preferably on a navigation display, and for the alternative routes to be displayed which are calculated if necessary.

In order sufficiently to inform devices for air traffic control or other responsible locations and authorities, provision can be made with the safety system according to the invention for the position of the aircraft, the airspace, and the alternative route which exists if necessary, to be displayed on a display device.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
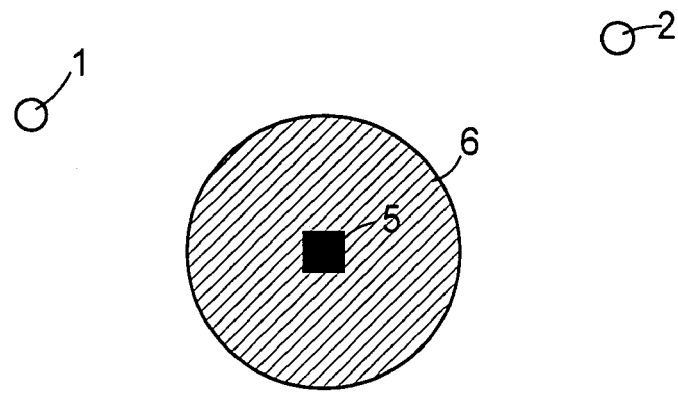
FIGS. 1 to 4 are different cartographic representations, each including a prohibited airspace.

The preferred embodiments of the present invention will now be described with reference to FIGS. 1-7 of the drawings. Identical elements in the various figures are designated with the same reference numerals.

FIG. 1 shows a portion, which is not illustrated in detail of a map with airports 1, 2, 3 and an object 5 to be protected. A prohibited airspace 6 is situated around the object 5 to be protected. In the embodiment exemplified in FIG. 1, this prohibited airspace has a circular cross-section and a height which is sufficient to prevent it being flown over by the aircraft in question or to prevent it from being flown over at an altitude which is too low.

Figure 2:
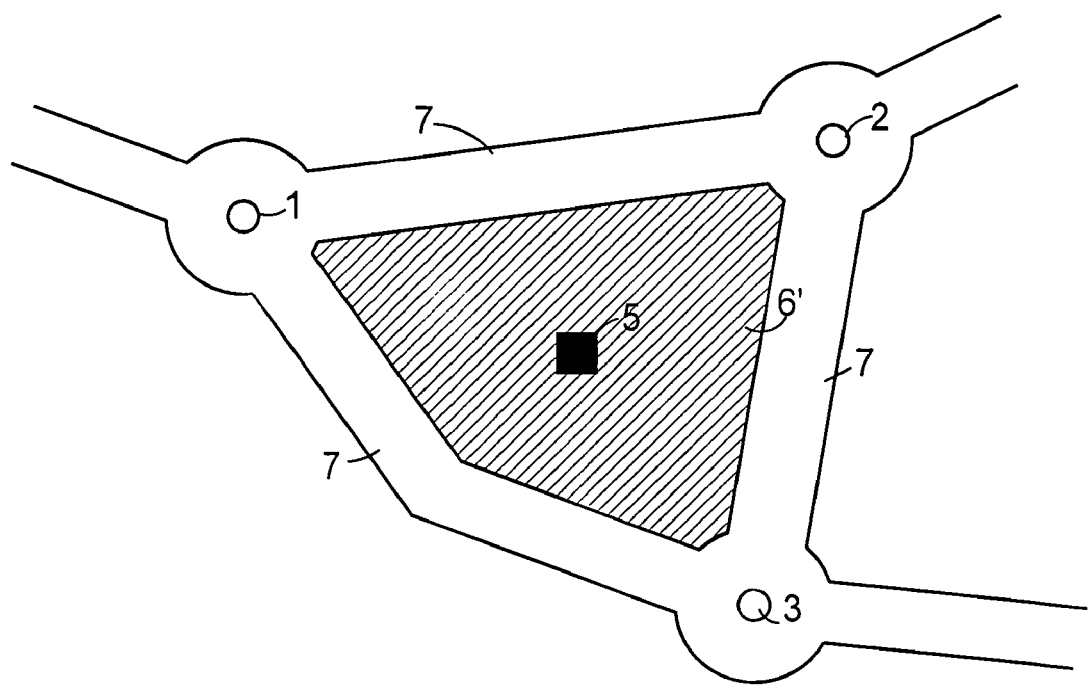

Whereas in the example shown in FIG. 1 aircraft are prevented from approaching the object 5 to be protected at less than the radius of the prohibited airspace 6, in the embodiment shown in FIG. 2 any deviation of air routes 7 towards the object 5 to be protected is prevented. For this purpose, the prohibited airspace 6' occupies practically the entire area between the air routes 7.

Figure 3:
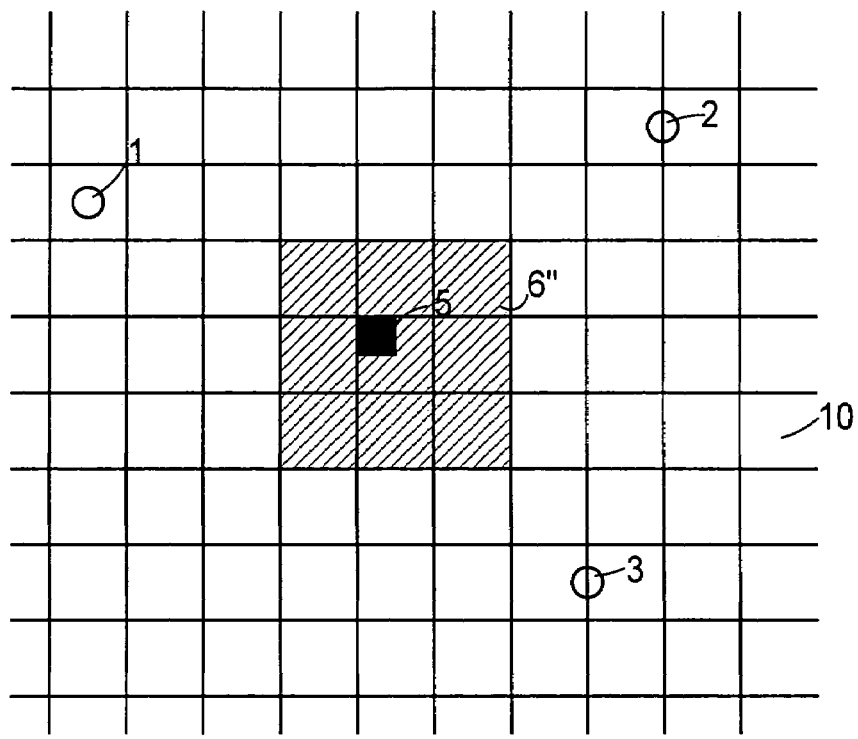
Figure 4:
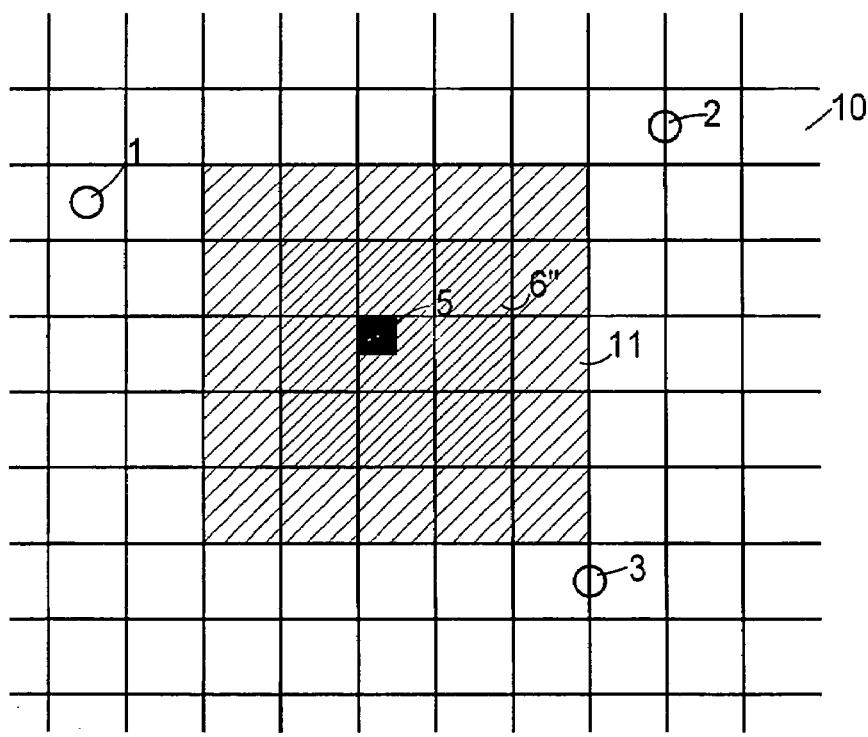

In the examples of embodiments shown in FIGS. 3 and 4, the airspace is partitioned into volume elements 10, for which values of a residence probability of objects with which an aircraft can collide are stored in a databank. If an object is actually situated within a volume element, the probability is 1; that is to say, 100%. For objects in motion, the probability is calculated of their being situated in the corresponding volume elements at predetermined times. Details of this procedure are given in the aforementioned patents.

In the examples of embodiments of the safety system (method and apparatus) according to the invention which are illustrated in FIGS. 3 and 4, volume elements which an aircraft should not enter are designated by a high probability, preferably 1. Moreover, enforced steering on to an alternative route is provided for. The particular residence probabilities for the volume elements which can be reached by the aircraft within the predetermined times are calculated for the "particular" aircraft in each case. If there is a volume element for which the probability that both the particular aircraft and the other object are situated there exceeds a predetermined threshold value, an alternative route is taken. In the safety system according to the invention, an object situated in the prohibited airspace 6" is simulated by specifying a high probability there.

In the example of an embodiment which is illustrated in FIG. 4, the prohibited airspace 6" has an edge 11 which is shown less densely hatched in FIG. 4. The volume elements of this edge are covered by a lower residence probability, so that if there are problems in the determination of a risk-free alternative route—on account of other aircraft, for example—the edge region 11 can still be flown through.

Figure 5:
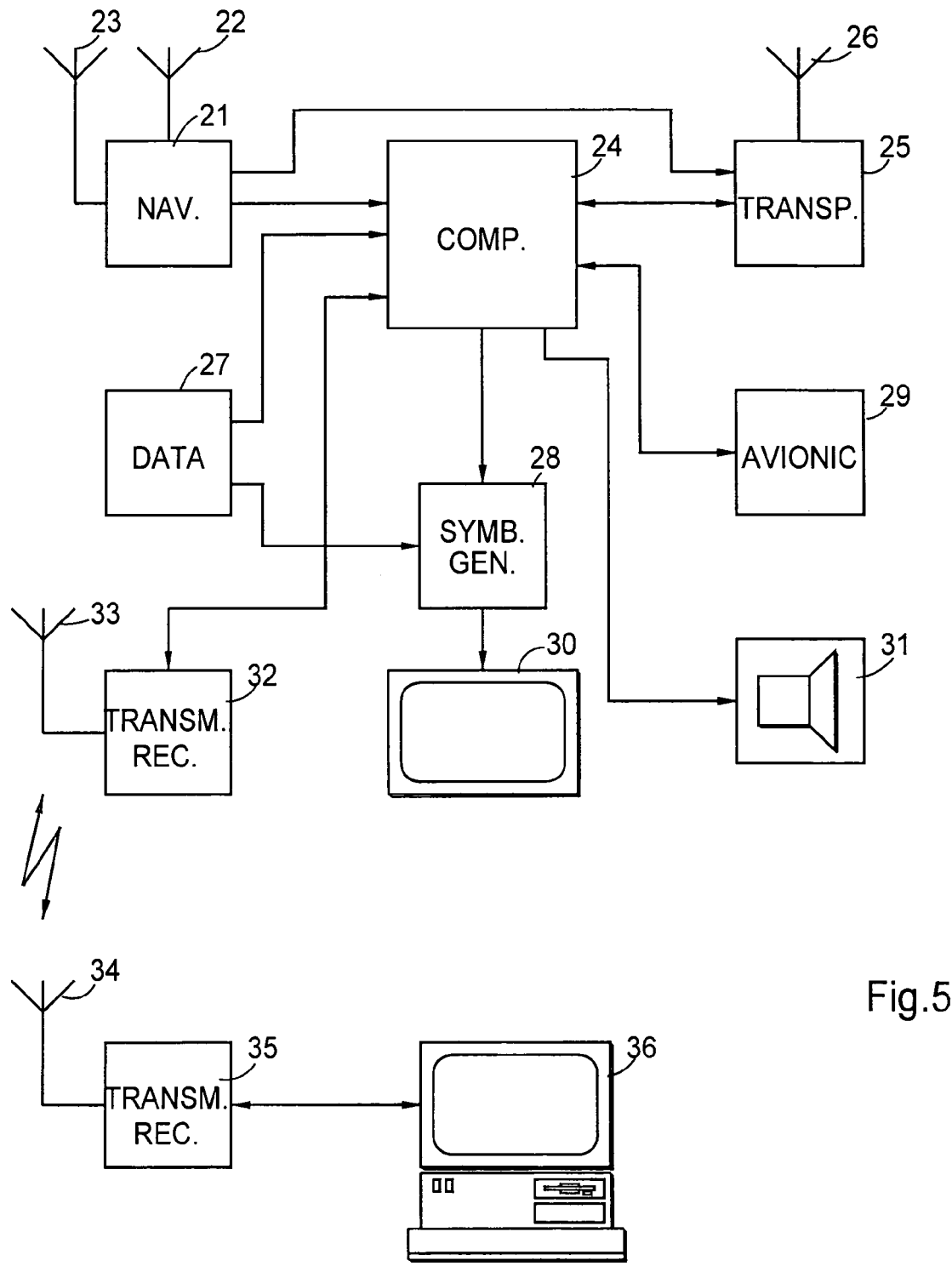
FIG. 5 is a block circuit diagram of a safety system according to the invention.

The device illustrated in FIG. 5 consists of a plurality of units, the function of which as such is known in principle and which are therefore not described in detail. A navigation unit 21 is provided with two antennas 22, 23 and receives signals from a GNS system, such as a global positioning system, for example. Antenna 22 is designed for receiving satellite signals, whilst differential signals for increasing the accuracy of determining the position can be received via antenna 23. The navigation unit 21 also contains other devices which are necessary for navigation, for example a compass and an altimeter. From the data and signals received from the compass and the altimeter, the navigation unit calculates the position and location of the aircraft, as well as changes in these data, particularly in the flying speed, the speed of change of course and the speed of ascent/descent.

These data are fed to a main computer 24 which is connected via a bidirectional data link to a transponder 25. The latter is a transmitter/receiver unit comprising one or more antennas 26 for the exchange of data with other aircraft, ground stations and vehicles. Data transmission-systems of this type are known in the art and do not need to be explained in more detail in connection with the present invention. A system which is suitable for the method according to the invention is described in the conference proceedings of The International Air Transport Association, Global Navcom '94, Geneva, 18 to 21 Jul. 1994, by J. Nilsson, Swedavia: "The Worldwide GNSS-Time Synchronized Self-Organising TDMA Data Link—A Key to the Implementation of Cost-Effective GNSS-Based CNS/ATM Systems".

A traffic collision avoidance system (TCAS II) can also be used for determining the relative position of another aircraft.

If advisable in the particular case, the data produced by the navigation unit 21 can also be transmitted directly to the transponder 25 insofar as they are provided for transmission to other aircraft.

The device illustrated also comprises a databank 27 in which, amongst other data, cartographic data on the terrain are stored, for example the prohibited airspaces illustrated in FIGS. 3 and 4. Since the calculation of the residence probability of other aircraft can be made to be dependent on the type of the corresponding other aircraft, data which relate to relevant aircraft and which are necessary for this purpose can also be stored in the databank 27. Data such as these essentially describe the capacity for movement of the aircraft, such as the maximum acceleration and the tightest curve radii. The data stored in the databank 27 can be called up by the main computer 24 according to the respective need. Insofar as the data are directly provided for graphic representation by means of the display 30, they can also be fed directly to a symbol generator 28.

In addition, the main computer 24 is connected to other computers of the avionics system 29 of the aircraft, so as to be able to call up the data necessary for calculating residence probabilities and alternative routes, and in order to convert them into the control commands which are necessary for automatically flying on alternative routes. Furthermore, an audio system is connected to the main computer 24 for the purpose of speech output.

The devices described above, as well as a transmitter/receiver 32 with an antenna 33, are situated in the aircraft. The transmitter/receiver 32 forms a radio link to a ground station, which also comprises an antenna 34 and a transmitter/receiver 35. The latter is connected to a computer 36 of a monitoring device, of air traffic control for example. As soon as the probability of entering the prohibited airspace is identified and an alternative route is calculated by the system according to the invention, this situation is reported to the ground station, whereupon all the flight data necessary for assessing the position are made visible on the screen of the computer 36. Suitable measures can then be introduced by the safety personnel, for example the steering of the aircraft to the next suitable landing strip or instructions to other aircraft to move out of or avoid the airspace concerned.

Figure 6:
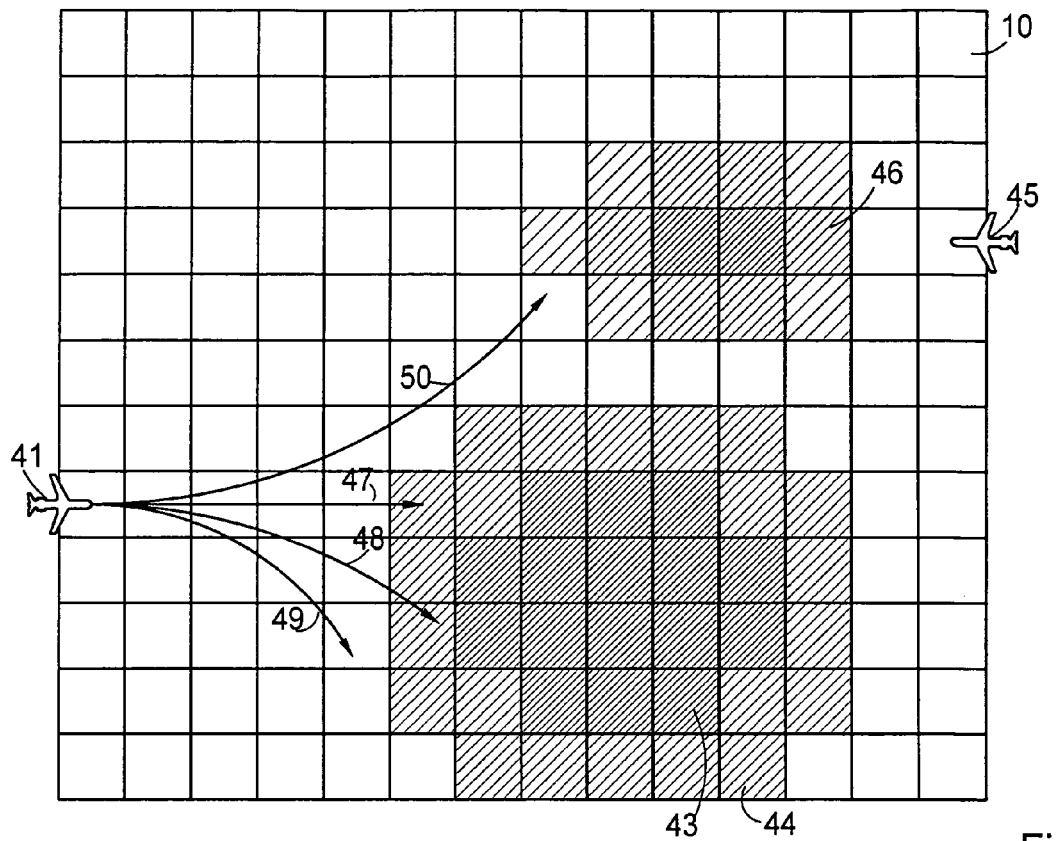
FIG. 6 is a view from above showing an example of the coverage of volume elements by residence probabilities.
Figure 7:
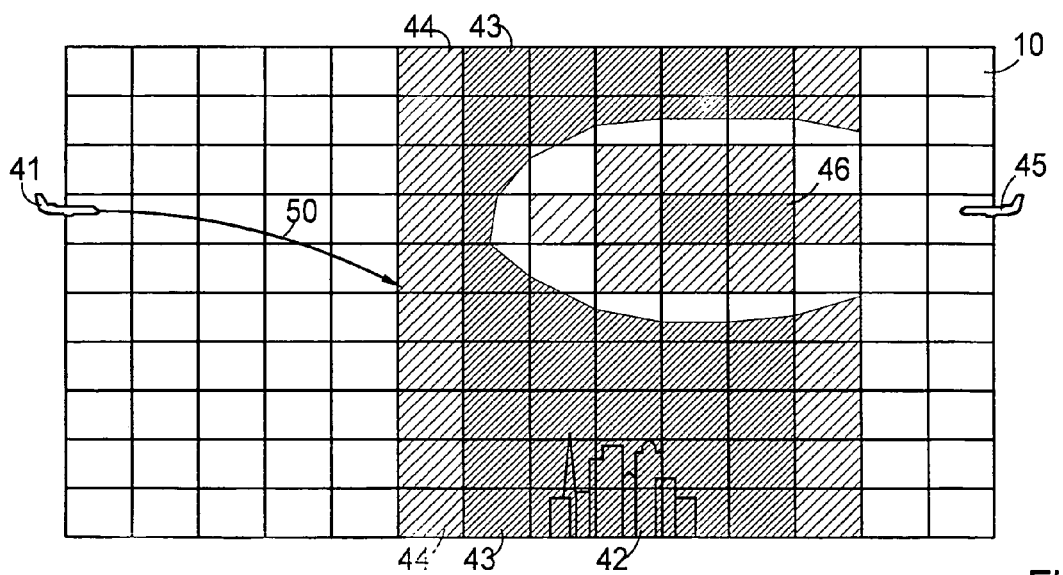
FIG. 7 is a side view of the subject of FIG. 6.

FIGS. 6 and 7 each show part of the air space—FIG. 6 as a plan view and FIG. 7 as a side view. An aircraft 41 enters the airspace. Inside the airspace there is an object 42 to be protected, with a prohibited airspace, which is represented by closer hatching, and an edge region 44. The prohibited airspace 43 and the edge region 44 extend to a height which can be reached by the aircraft in question. A further aircraft 45 enters the airspace from the opposite direction. Probabilities with which the aircraft 45 is resident in volume elements 46 at the time considered are also emphasised by hatching, the density of which is higher the higher is the probability. In order to provide a view of the volume elements 46 in FIG. 7, the hatching of the prohibited airspace 43 and of the edge region 44 has been correspondingly discontinued. For the sake of clarity, the residence probabilities of the aircraft 41 are not illustrated.

There now follows an explanation of the determination of an alternative route, wherein in a preceding step the risk of a "collision" with the prohibited airspace has been identified by the collision probability for one or more volume elements exceeding a permissible value if aircraft 41 flies on route 47 and there is thus a high probability of aircraft 41 entering the prohibited airspace 43, or at least entering the edge region 44.

As a test, alternative routes 48, 49 are calculated according to general alternative rules, with the result that route 48 does not prevent entry into the prohibited airspace, and route 49 necessitates a turning speed which is too high and is therefore not used. A route 50 is then calculated, which at constant altitude, however, signifies a risk of collision with the other aircraft 45. In order to avoid this in the example illustrated, the flying altitude is reduced (FIG. 7) in addition to a change of course, so that aircraft 41 can avoid the prohibited airspace 43 without a hazardous approach to aircraft 45.

There has thus been shown and described a novel safety system for aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A safety method for aircraft comprising the steps of:
marking prohibited airspaces, which controlled aircraft may not enter, on a digitally stored image of the airspace;
dividing the airspace into predetermined volume elements;
calculating probabilities in which the aircraft will be situated in predetermined volume elements at a plurality of selected points in time (residence probabilities);
calculating probabilities of the residence of the aircraft in each volume element (collision probabilities) of the predetermined volume elements for the selected points in time from the residence probabilities of the aircraft and from residence probabilities of the volume elements of the prohibited airspace, the latter of which are set to one;
calculating an alternative route if the collision probability exceeds a predetermined value for at least one volume element; and
automatically steering the aircraft on to the alternative route which is situated outside the prohibited airspace by means of an automatic control device on board the aircraft.

2. A safety method according to claim 1, wherein the height of the prohibited airspace is greater than the height which can be reached by the controlled aircraft.

3. A safety method according to claim 1, further comprising the step of activating the automatic control device to steer the aircraft only after the input of a command, and permitting deactivation of the automatic control device only by a secure method which prevents unauthorized deactivation.

4. A safety method according to claim 1, wherein the automatic control device can only be deactivated by means of a device situated outside the aircraft.

5. A safety method according to claim 1, wherein the automatic control device can only be deactivated when the aircraft is on the ground.

6. A safety method according to claim 1, wherein the automatic control device includes means for automatically landing the aircraft.

7. A safety method according to claim 6, wherein the location of the automatic landing is predetermined by means of a device situated outside the aircraft.

8. A safety method according to claim 1, further comprising the step of taking over control of the aircraft on the alternative route by means of a device situated outside the aircraft.

9. A safety method according to claim 3, further comprising the step of sending a message to a device for air traffic control when the automatic control device is activated.

10. A safety method according to claim 1, further comprising the step of selecting an alternative route when the aircraft approaches a moveable object, thereby to avoid the movable object.

11. A safety method according to claim 1, further comprising the step of automatically steering the aircraft to an alternative route when it approaches other objects, including other aircraft.

12. A safety method according to claim 1, further comprising the step of displaying the airspace, the position of the aircraft in the airspace, and the alternative route, if any, on a display device.

13. A safety method according to claim 1, wherein a plurality of alternative routes, with a deviation which increases from alternative route to alternative route, are initially calculated according to recognized or established alternative rules, and wherein the calculated alternative route with the smallest deviation, which results in a probability of entry into the prohibited airspace that is less than a predetermined threshold value is selected and is converted into a control command for said automatic control device.

14. A safety method according to claim 13, wherein, when a limiting deviation is reached without the probability of entry into the prohibited airspace being correspondingly reduced, alternative routes in another direction are calculated.

15. A safety method according to claim 1, wherein residence probabilities of other objects are additionally taken into consideration for the calculation of the alternative route.

16. A safety method according to claim 1, wherein, for volume elements which are situated in an edge region around the prohibited airspace, the residence probabilities are set to a lesser value than that of the prohibited airspace.

17. A safety method according claim 1, further comprising the step of emitting a warning signal for the pilot when the aircraft approaches a prohibited airspace.

18. A safety method according to claim 1, further comprising the step of emitting a warning signal for the pilot when the automatic control device takes over the automatic control of the aircraft.

19. A safety method according to claim 1, further comprising the step of displaying prohibited airspaces, and displaying the alternative routes which are calculated, on a display device, preferably a navigation display device.

* * * * *